Sept. 22, 1970 P. PENSA 3,529,687
DRIVE ARRANGEMENT FOR TRACKED VEHICLES
Filed June 26, 1968 2 Sheets-Sheet 1
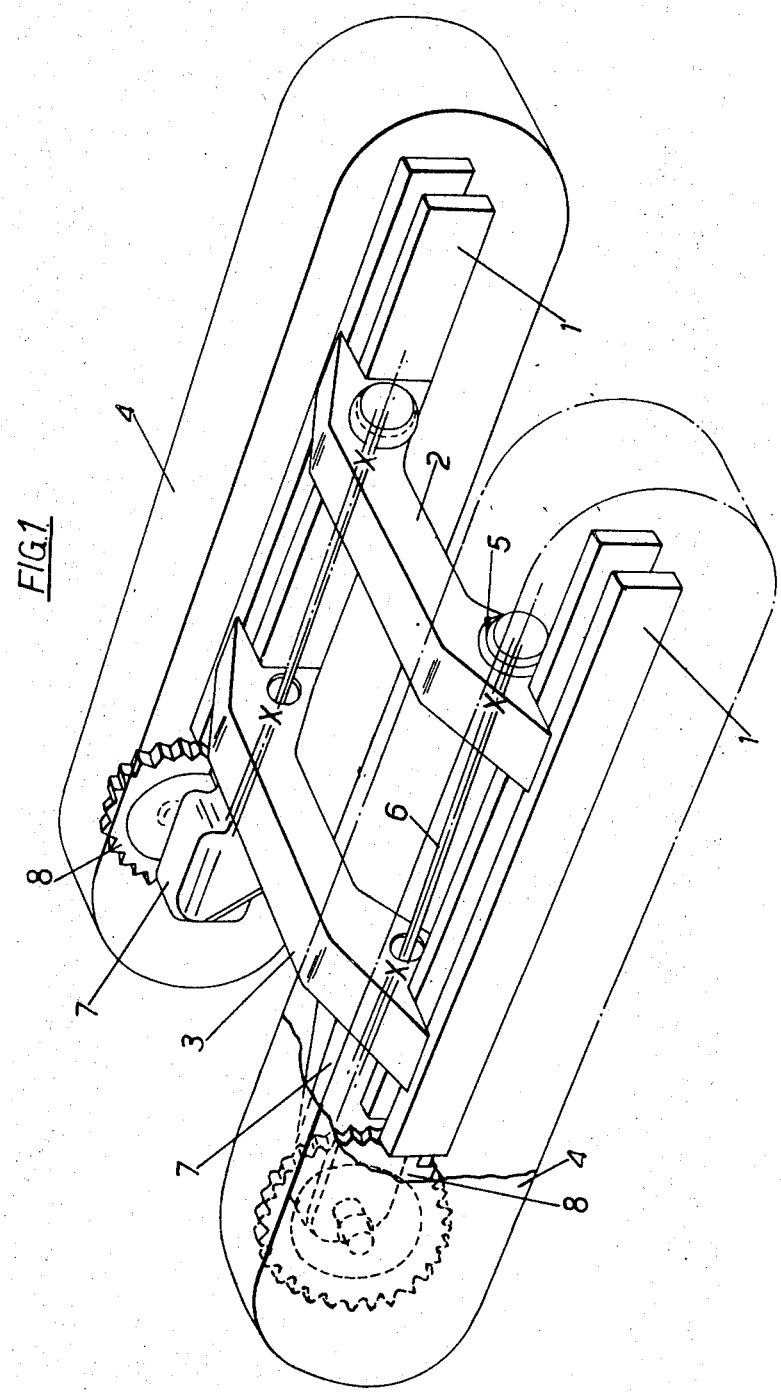
Inventor
PIETRO PENSA
BY Tweedale & Gerhardt
Attorneys

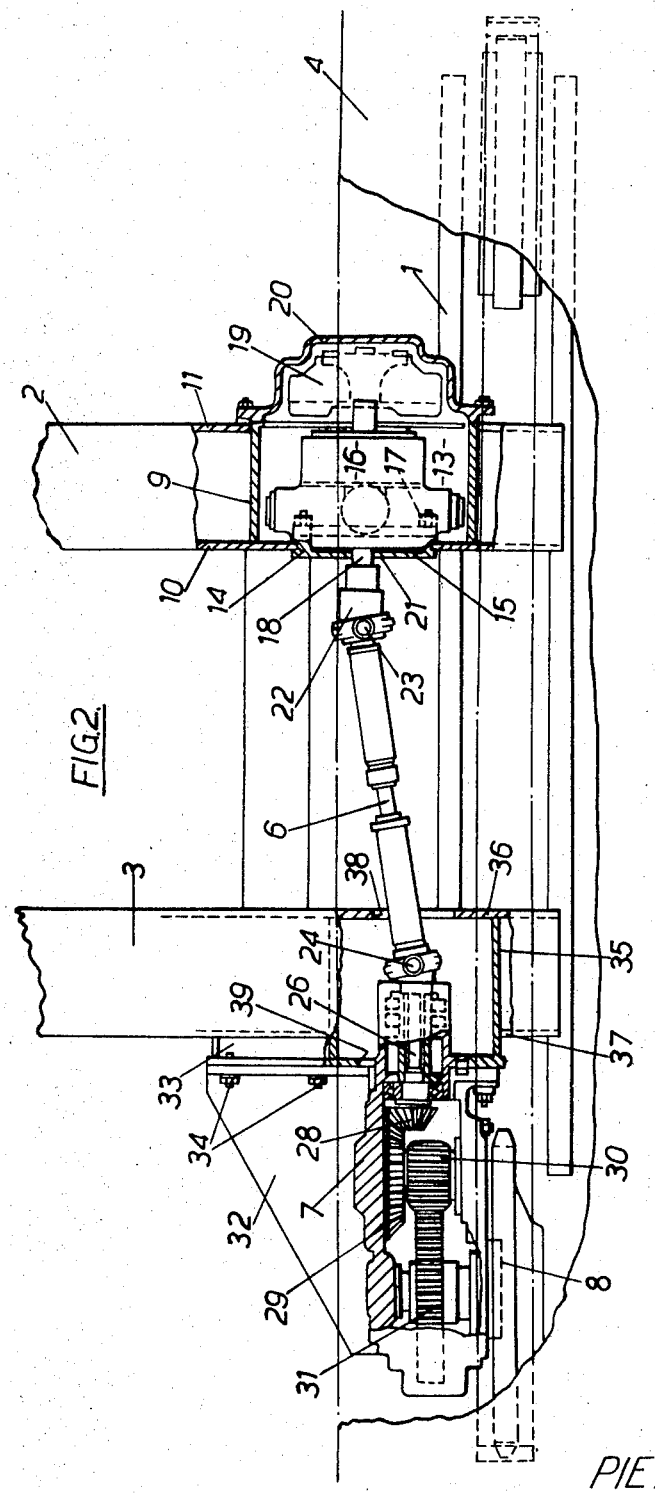

United States Patent Office 3,529,687
Patented Sept. 22, 1970

3,529,687
DRIVE ARRANGEMENT FOR TRACKED
VEHICLES
Pietro Pensa, Esino Lario, Como, Italy, assignor to
Massey-Ferguson Services N.V., Caracao, Netherlands
Antilles, a corporation of the Netherlands Antilles
Filed June 26, 1968, Ser. No. 740,110
Claims priority, application Italy, July 3, 1967,
17,937/67
Int. Cl. B62d 11/04
U.S. Cl. 180—6.48                                      8 Claims

ABSTRACT OF THE DISCLOSURE

A tracked vehicle has a pair of tracks mounted on spaced support frames that are interconnected by a pair of spaced hollow cross-members. Hydraulic motors are mounted within the front cross-member at either side and include forwardly mounted brakes. A drive shaft extends rearwardly from each motor through the rear cross-member to a gearbox partially mounted within the rear cross-member. Each gearbox mounts a drive wheel for one of the tracks.

This invention relates generally to tracked vehicles and more particularly for a drive arrangement therefor.

Tracked vehicles are normally subject to hard use and frequently encounter rocks, concrete, timber and other objects which may cause damage to any unprotected components of the vehicle. It is therefore necessary to provide a protective structure to house easily damaged components such as the power source, hydraulic systems, etc.

The primary object of this invention is to provide the frame structure of a tracked vehicle with a portion for housing the power source within the frame structure, thereby precluding the necessity for any additional protective framework therefor.

Another object is to provide a track frame for each track, and at least one hollow cross-member extending between the track frames which forms the protective housing for the power source.

A further object is to provide another hollow cross-member spaced rearwardly from the one cross-member and which forms a housing for a portion of the power transmission that interconnects the power source and the tracks.

These and other objects and features of this invention will become more readily apparent upon reference to the following detailed description of a preferred embodiment of this invention, having reference to the accompanying drawings, in which:

FIG. 1 is a schematic three-dimensional view of the chassis of a tracked vehicle according to the present invention, part being shown in section, and FIG. 2 is a partly sectioned plan view of part of FIG. 1 to a larger scale and in more detail.

The chassis of a tracked vehicle is shown in FIG. 1 and is constituted by two track frames 1 joined by two hollow cross-members 2 and 3. The cross-member 2 is the foremost. The tracks 4 are represented in outline and the right-hand one is partially cut away to show the chassis disposition. A turntable base may be secured on top of the cross-members 2 and 3 but as this and the superstructure it supports, does not form part of the present invention, it is not illustrated. Power sources or motor means in the form of hydraulic motors for driving the tracks are housed in the cross-member 2 at 5 and shafts 6 extend one from each motor and through the rear cross-member 3 to gearboxes 7, the shafts 6 and the gearboxes 7 forming transmission means. The crosses indicated in FIG. 1 at the ends of the shafts 6 represent universal joints. Toothed driving wheels 8 are mounted on and driven by the gearboxes 7.

FIG. 2 shows the drive arrangement for one of the tracks in more detail. The cross-member 2 is reinforced with a tubular insert 9 welded to the rear wall 10 and to the front wall 11 of cross-member 2 so as to define a cavity 13 for receiving one of the motors 16. An aperture 14 in the rear wall 10 of cross-member 2 locates a mounting plate 15 by means of which the hydraulic motor 16 is mounted and located within the cavity 13. The motor 16 is secured to the mounting plate 15 by means of bolts 17 shown in dotted outline, and the motor 16 is of the radial piston type.

At the front end of the motor 16, the motor shaft 18 protrudes and to this is secured the rotor of a brake 19, shown in outline only. A detachable cover plate 20 for brake rotor 19 is bolted to cross-member 2 to seal the cavity 13 against the ingress of dust.

At the rear of the motor 16, the motor shaft 18 is splined and protrudes through a sealed aperture 21 in the mounting plate 15, and into splined engagement with a correspondingly splined sleeve 22 which forms part of a universal joint assembly 23. The shaft includes a central telescopic portion and extends rearwardly therefrom through an aperture 38 in cross-member 3 and terminates in another universal joint assembly 24 which is splined to an input shaft 26 of the gearbox 7. Within the gearbox 7, which is a reduction gear, drive is taken through a small bevel pinion 28 which meshes with a large bevel pinion gear 29, a small spur gear 30 and a large spur gear 31 to the drive wheel 8.

The gearbox 7 is securely mounted on a bracket 32 bolted to a rearward extension 33 of the rear cross-member 3 by bolts 34. A tubular reinforcement 35 welded to the front wall 36 and to the rear wall 37 of the cross-member 3 defines a cavity which houses a portion of the gearbox 7 and also the rear universal joint 24. Apertures 38 and 39 in the front and rear walls 36 and 37, respectively of cross-member 3 permit the insertion of the universal joint 24 and the input portion of the gearbox 7.

It will be apparent that the delivery of pressure fluid to the hydraulic motor 16 will result in rotation of the motor 16, shafts 18, 6 and 26, gears 28, 29, 30 and 31 and finally the drive wheel 8.

The embodiment of this invention described is advantageous in that the hydraulic motor is located in a place where it is well protected from external damage and yet is freely accessible from the front of cross-member 2 for servicing. This precludes the necessity of any additional protective framework. Moreover, the brake is located in an easily accessible position for inspection and maintenance.

Modifications of the described embodiment within the scope of the appended claims include, for example, the use of one or more electrically powered motors, the provision of three or more cross-members, the provision of only one cross-member having a greater fore-and-aft dimension than the cross-members illustrated, and the use of electrical or hydraulic speed-reducing means in place of the mechanical gearbox. The cross-members need not be hollow over all of their length, but may be of open construction or even solid.

What is claimed is:

1. A tracked vehicle having a chassis which includes a track frame for each track and a cross-member connected to and extending between the track frames, a second cross-member connected to and extending between the track frames and spaced rearwardly from the first cross-member, motor means, a drive wheel for each track, transmission means providing a driving connection between the motor means and each drive wheel, means mounting and locating the motor means within a portion of one of the cross-members, the cross-member forming a housing for the motor means, and means mounting part of the transmission means within the other cross-member.

2. A tracked vehicle according to claim 1, wherein the motor means comprises a separate motor for each track, and means are provided for mounting and locating each motor within a portion of the one cross-member.

3. A tracked vehicle according to claim 2, wherein the said part of the transmission means comprises a separate gearbox for each track.

4. A tracked vehicle according to claim 3, wherein each drive wheel is carried by one of the gearboxes.

5. A tracked vehicle according to claim 3, wherein the transmission means includes universally jointed shafts each connecting one of the motors to one of the gearboxes.

6. A tracked vehicle according to claim 5, wherein means are provided for mounting a part of each gearbox within the other cross-member.

7. A tracked vehicle according to claim 2, including brakes connected one to each motor and mounted on a forwardly directed face of the said one cross-member.

8. A tracked vehicle according to claim 1, wherein the motor means comprises at least one hydraulic motor.

References Cited

UNITED STATES PATENTS

| | | | |
|---|---|---|---|
| 2,046,517 | 7/1936 | Jones | 180—6.48 |
| 2,833,360 | 5/1958 | Spanjer | 180—6.48 |
| 3,204,712 | 9/1965 | Gray | 180—9.62 X |

LEO FRIAGLIA, Primary Examiner

J. A. PEKAR, Assistant Examiner

U.S. Cl. X.R.

180—6.7, 9.2